United States Patent
Weng et al.

(10) Patent No.: US 11,807,787 B2
(45) Date of Patent: Nov. 7, 2023

(54) LUMINESCENCE CONVERSION MATERIAL AND FABRICATION METHOD THEREOF

(71) Applicant: INDUSTRIAL TECHNOLOGY RESEARCH INSTITUTE, Hsinchu (TW)

(72) Inventors: Chin-Cheng Weng, Kaohsiung (TW); Ming-Chang Li, Tainan (TW); Po-Jung Hsu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 70 days.

(21) Appl. No.: 17/563,367

(22) Filed: Dec. 28, 2021

(65) Prior Publication Data

US 2023/0203367 A1    Jun. 29, 2023

(51) Int. Cl.
| | | |
|---|---|---|
| *C09K 11/02* | (2006.01) | |
| *C09K 11/08* | (2006.01) | |
| *C09K 11/70* | (2006.01) | |
| *C08K 9/02* | (2006.01) | |
| *C09K 11/88* | (2006.01) | |
| *B82Y 40/00* | (2011.01) | |
| *B82Y 20/00* | (2011.01) | |

(52) U.S. Cl.
CPC ............ *C09K 11/025* (2013.01); *C08K 9/02* (2013.01); *C09K 11/0883* (2013.01); *C09K 11/703* (2013.01); *C09K 11/883* (2013.01); *B82Y 20/00* (2013.01); *B82Y 40/00* (2013.01); *C01P 2004/80* (2013.01)

(58) Field of Classification Search
CPC . C09K 11/025; C09K 11/0883; C09K 11/703; C09K 11/883; C01P 2004/80
See application file for complete search history.

(56) References Cited

U.S. PATENT DOCUMENTS

| 8,921,827 B2 | 12/2014 | Pickett et al. |
| 9,831,397 B2 | 11/2017 | Theobald et al. |
| 11,015,114 B2 | 5/2021 | Budd et al. |
| 2014/0264196 A1* | 9/2014 | Werner .................. C23C 16/30 977/774 |
| 2016/0027966 A1 | 1/2016 | Dubrow et al. |
| 2016/0268483 A1* | 9/2016 | Theobald .............. H01L 33/502 |
| 2017/0005241 A1* | 1/2017 | Lotito ...................... B82B 1/00 |
| 2021/0032534 A1 | 2/2021 | Sun et al. |

FOREIGN PATENT DOCUMENTS

| CN | 105051152 A | 11/2015 |
| CN | 109652059 A | 4/2019 |
| CN | 109679645 A | 4/2019 |
| CN | 111849459 A | 10/2020 |
| CN | 112048296 A | 12/2020 |
| TW | I563687 B | 12/2016 |
| TW | I605619 B | 11/2017 |
| TW | I655268 B | 4/2019 |
| WO | WO 2017/004145 A1 | 1/2017 |

OTHER PUBLICATIONS

Devloo-Casier et al., "A Case Study of ALD Encapsulation of Quantum Dots: Embedding Supported CdSe/CdS/ZnS Quantum Dots in a ZnO Matrix," The Journal of Physical Chemistry C, vol. 120, 2016, pp. 18039-18045, 7 pages total.

Xiang et al., "Bottom up Stabilization of CsPbBr3 Quantum Dots-Silica Sphere with Selective Surface Passivation via Atomic Layer Deposition," Chemistry of Materials, vol. 30, 2018, pp. 8486-8494, 9 pages total.

Taiwanese Office Action and Search Report for Taiwanese Application No. 110149097, dated Nov. 4, 2022.

* cited by examiner

*Primary Examiner* — C Melissa Koslow
(74) *Attorney, Agent, or Firm* — Birch, Stewart, Kolasch & Birch, LLP

(57) ABSTRACT

A luminescence conversion material is provided. The luminescence conversion material includes: a hybrid luminescence conversion particle, a first cladding material covering the hybrid luminescence conversion particle, and a second cladding material formed on the first cladding material and covering the first cladding material. The hybrid luminescence conversion particle includes a matrix and a plurality of quantum dots uniformly dispersed in the matrix. The first cladding material includes silicon oxide. The ratio α (absorbance ratio α: $A_{939}/A_{1000-1150}$) of the absorbance at 939 cm$^{-1}$ ($A_{939}$) to the absorbance peak at 1000-1150 cm$^{-1}$ ($A_{1000-1150}$) in a FTIR spectrum of the first cladding material is less than or equal to 0.8.

16 Claims, 6 Drawing Sheets

US 11,807,787 B2

LUMINESCENCE CONVERSION MATERIAL AND FABRICATION METHOD THEREOF

TECHNICAL FIELD

The technical field relates to a luminescence conversion material and a fabrication method thereof.

BACKGROUND

Quantum dots (quantum dots, QDs) are nanoscale semiconductor materials that typically have a crystal structure composed of hundreds to thousands of atoms. Quantum dots have photoluminescent properties. Compared to conventional organic dye molecules, quantum dots have the advantages of higher fluorescence, better stability, and adjustable fluorescence wavelength.

Quantum dots are highly promising materials for a wide range of applications. For example, quantum dots can be used in the formation of laser components, optical sensors, memory components, solar photovoltaic components, display components, and bio-detection components.

However, quantum dots are susceptible to oxidation by light, water and oxygen in the environment. The oxidation of quantum dots may cause wavelength shifting, a widening of the bandwidth at half height in the emission spectrum, and a decline in quantum efficiency.

Therefore, there is still a need in the art to find better luminescence conversion materials and methods of preparing them, wherein oxidation or deterioration of the quantum dots in the luminescence conversion materials due to oxygen or water can be avoided. Therefore, luminescence conversion materials having better optical properties and a longer service life are provided.

SUMMARY

Some embodiments of the present disclosure provide a luminescence conversion material comprising: a hybrid luminescence conversion particle, a first cladding material cladding the hybrid luminescence conversion particle, and a second cladding material formed on the first cladding material and cladding the first cladding material. The hybrid luminescence conversion particle comprises a matrix and a plurality of quantum dots uniformly dispersed in the matrix. The first cladding material comprises silicon oxide. A ratio $\alpha$ (absorbance ratio $\alpha$: $A_{939}/A_{1000-1150}$) of the absorbance at 939 cm$^{-1}$ ($A_{939}$) to the absorbance peak at 1000-1150 cm$^{-1}$ ($A_{1000-1150}$) in a Fourier-transform infrared spectroscopy (FTIR) spectrum of the first cladding material is less than or equal to 0.8.

Some embodiments of the present disclosure provide a fabrication method of a luminescence conversion material comprising: forming a hybrid luminescence conversion particle; forming a first cladding material on the surface of the hybrid luminescence conversion particle using an acid/base two-step process; and forming a second cladding material on the first cladding material using an atomic layer deposition process. The luminescence conversion material comprises a matrix and a plurality of quantum dots uniformly dispersed in the matrix. The first cladding material comprises silicon oxide. A ratio $\alpha$ (absorbance ratio $\alpha$: $A_{939}/A_{1000-1150}$) of the absorbance at 939 cm$^{-1}$ (A939) to the absorbance peak at 1000-1150 cm$^{-1}$ ($A_{1000-1150}$) in a Fourier-transform infrared spectroscopy (FTIR) spectrum of the first cladding material is less than or equal to 0.8.

Some embodiments of the present disclosure provide a display device comprising the aforementioned luminescence conversion material.

Some embodiments of the present disclosure provide a luminescence device comprising the aforementioned luminescence conversion material.

In order to make the features and benefits of the embodiments of the present disclosure more apparent and understandable, the disclosure is described in detail below in conjunction with the accompanying drawings.

BRIEF DESCRIPTION OF DRAWINGS

Exemplary embodiments of the present disclosure are described in detail below in conjunction with the accompanying drawings, wherein.

DETAILED DESCRIPTION

Figure 1:
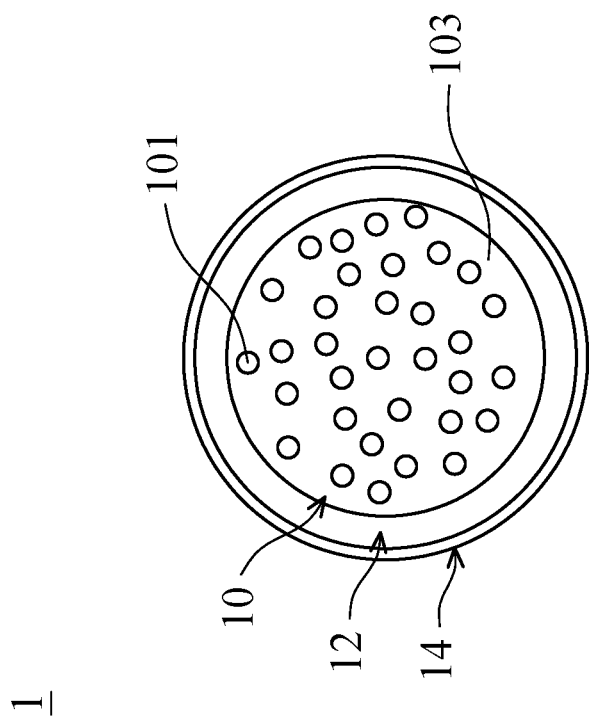
FIG. 1 illustrates a schematic view of a luminescence conversion material according to some embodiments of the present disclosure.

The following is a detailed description of the components of some embodiments of the present disclosure. It should be understood that the following description provides many different embodiments or examples for implementing different embodiments of the present disclosure. The particular components and arrangements described below are intended only to briefly and clearly describe some embodiments of the present disclosure. These are intended to be examples only and not limitations of the present disclosure. In addition, the present disclosure may repeat reference numerals and/or letters in the various examples. This repetition is for the purpose of simplicity and clarity and does not in itself dictate a relationship between the various embodiments and/or configurations discussed. Further, when a first material layer is described as being on or above a second material layer, this includes embodiments where the first material layer is in direct contact with the second material layer. Alternatively, there may be one or more other material layers formed between the first material layer and the second material layer, in such embodiment, the first material layer and the second material layer may not be in direct contact with each other.

Here, the terms "about", "approximately", "substantially" usually means within 20%, within 10%, within 5%, within 3%, within 2%, within 1% or within 0.5% of a given value or range. Here, the given value is an approximate number. That is, in the absence of a specific description of "about", "approximately", "substantially", the meaning of "about", "approximately", "substantially" may still be implied. Here, the term "less than or equal to" indicates a range that contains a given value and values below that given value, and the term "greater than or equal to" indicates a range that contains a given value and values above that given value. Conversely, the term "less than" indicates a range that contains values less than a given value but does not contain that given value, and the term "greater than" indicates a range that contains values more than a given value but does not contain that given value. For example, "greater than or equal to a" means a range including values of a and values above a, and "greater than a" means a range including values more than a but not including a.

It should be understood that, although the terms "first", "second", "third" etc. are used herein to describe various elements, components, regions, layers and/or parts, these elements, components, regions, layers and/or parts should not be limited by these terms. These terms are only used to distinguish one elements, components, regions, layers, and/or parts from other elements, components, regions, layers, and/or parts. Thus, a first element, component, region, layer, and/or part discussed below could be termed as a second element, component, region, layer, and/or part without departing from the teachings of the present disclosure.

Unless defined otherwise, all technical and scientific terms used herein have the same meaning as commonly understood by one of ordinary skills in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

Some embodiments of the present disclosure may be understood in conjunction with the drawings, and the drawings of the embodiments of the present disclosure are considered to be part of the description of the embodiments of the present disclosure. It should be understand that the drawings of the embodiments of the present disclosure are not drawn to the scale of actual devices and components. The shape and thickness of a feature of the embodiments may be exaggerated in the drawings in order to clearly show the features of the embodiment of the present disclosure. In addition, the structures and devices in the drawings are shown schematically so that the features of the embodiment of the present disclosure are clearly shown.

In some embodiments of the present disclosure, spatially relative terms, such as "down," "up," "horizontal," "vertical," "below," "above," "top," "bottom," and the like should be understood to mean the orientation depicted in the paragraph and associated drawings. This spatially relative terms are for illustrative purposes only and do not imply that the device described is manufactured or operated in a particular orientation. Unless otherwise defined, the terms "joint" and "interconnection" can mean that two structures are in direct contact with each other, or that two structures are not in direct contact with each other and other structures are located between them. The term "join" may also include the embodiments where both structures are movable, or where both structures are fixed.

Some embodiments of the present disclosure provide a luminescence conversion material comprising: a hybrid luminescence conversion particle, a first cladding material cladding the hybrid luminescence conversion particle, and a second cladding material formed on the first cladding material and cladding the hybrid luminescence conversion particle. The hybrid luminescence conversion particle comprises a matrix, and a plurality of quantum dots uniformly dispersed in the matrix. The first cladding material comprises silicon oxide. The ratio α (absorbance ratio α: $A_{939}/A_{1000-1150}$) of the absorbance at 939 cm$^{-1}$ ($A_{939}$) to the absorbance peak at 1000-1150 cm$^{-1}$ ($A_{1000-1150}$) in a Fourier-transform infrared spectroscopy (FTIR) spectrum of the first cladding material is less than or equal to 0.8.

The above luminescence conversion material is described in detail below in conjunction with the accompanying drawings. FIG. 1 illustrates a schematic view of a luminescence conversion material 1 according to some embodiments of the present disclosure. As shown in FIG. 1, the luminescence conversion material 1 comprises a hybrid luminescence conversion particle 10, a first cladding material 12 cladding the hybrid luminescence conversion particle 10, and a second cladding material 14 formed on the first cladding material 12 and cladding the hybrid luminescence conversion particle 10 and the first cladding material 12. In an embodiment, the particle size of the luminescence conversion material 1 may be 0.2-50 μm. In another embodiment, the particle size of the luminescence conversion material 1 may be 0.5-50 μm, 0.5-40 μm, 1-45 μm, 5-40 μm, 5-50 μm, 7.5 μm, 10 μm, 15 μm, 20 μm, 25 μm, 30 μm, or 35 μm, but the present disclosure is not limited thereto. When the particle size of the luminescence conversion material 1 is larger than 50 μm, it is difficult to conduct operations in the fabrication method of the luminescence conversion material. When the particle size of the luminescence conversion material 1 is smaller than 0.2 μm, the luminescence conversion material cannot provide sufficient protection to the hybrid luminescence conversion particle 10 encapsulated therein.

As shown in FIG. 1, the hybrid luminescence conversion particle 10 may comprise a matrix 103 and a plurality of quantum dots 101 uniformly dispersed in the matrix 103. In an embodiment, the hybrid luminescence conversion particle 10 may have a particle size of about 0.1-40 μm. In another embodiment, the particle size of the hybrid luminescence conversion particle 10 may be 0.2-38 μm, 0.5-35 μm, 1-32 μm, 2-30 μm, 5-25 μm, 7.5 μm, 10 μm, 12.5 μm, 15 μm, 20 μm, 25 μm, or 32.5 μm, but the present disclosure is not limited thereto. When the content of the quantum dots 101 in the hybrid luminescence conversion particle 10 is too low, the hybrid luminescence conversion particle 10 may not provide a desired converted color. When the content of the quantum dots 101 in the hybrid luminescence conversion particle 10 is too high, the luminous efficiency of the hybrid luminescence conversion particle 10 is poor.

In an embodiment, the matrix 103 may comprise a resin containing cross-linkable monomers. The cross-linkable monomers may comprise acrylic monomers, epoxy resin monomers, siloxane monomers, or a combination thereof. Examples of the acrylic monomers may comprise, but not limited to, acrylate based monomers, monomethyl cis-butenedioic acids, monomethyl itaconic acids, monomethyl trans-butenedioic acids, styrene, and triallyl isocyanurates (TAIC). Examples of the acrylate based monomers may comprise, but not limited to, an acrylic acid (AA), a glycidyl methacrylate (GMA), a methyl acrylate, a methyl methacrylate (MMA), an ethyl acrylate (EA), an isobornyl acrylate (IBOA), an isooctyl acrylate, a butyl acrylate, a butyl methacrylate, an ethyl hexyl acrylate, a 2-hydroxyethyl acrylate (2-HEA), and a 1,12-dodecanediol dimethacrylate.

In an embodiment, the acrylic monomers may be monomers containing two acrylate groups or two methacrylate groups, such as dioxane glycol diacrylates, hydroxypivalyl hydroxypivalate diacrylates, 1,6-hexanediol diacrylates, ethoxylated 1,6-hexanediol diacrylates, dipropylene glycol diacrylates, tripropylene glycol diacrylates, tricyclodecane dimethanol diacrylates, polyethylene glycol (200) diacrylates (molecular weight 200), polyethylene glycol (400) diacrylates (molecular weight 400), polyethylene glycol (600) diacrylates (molecular weight 600), polyethylene glycol (200) dimethacrylates (molecular weight 200), polyethylene glycol (400) dimethacrylates (molecular weight 400), 2-hydroxyethyl metharcrylate phosphates, neopentyl glycol diacrylates, propoxylated neopentyl glycol diacrylates, ethoxylated bisphenol-A diacrylates, ethoxylated bisphenol-A dimethacrylates, 2-methyl-1,3-propanediol diacrylates, ethoxylated 2-methyl-1,3-propanediol diacrylates, 2-butyl-2-ethyl-1,3-propanediol diacrylates, ethylene glycol dimethacrylates (EGDMA), triethylene glycol dimethacrylates, diethylene glycol dimethacrylates, 1,4-butanediol diacrylates, 1,6-hexanediol dimethacrylates, allylated cyclohexyl dimethacrylates, or combinations of the above monomers.

In an embodiment, the monomers may be monomers containing three acrylate groups or three methacrylate groups, such as tris(2-hydroxy ethyl)isocyanurate triacrylates, pentaerythritol triacrylates, ethoxylated trimethylolpropane triacrylates, ethoxylated trimethylolpropane trimethacrylates, propoxylated trimethylolpropane triacrylates, trimethylolpropane trimethacrylates, trimethylolpropane triacrylates, pentaerythritol triacrylates, ethoxylated pentaerythritol triacrylates, propoxylated glycerol triacrylates, propoxylated pentaerythritol triacrylates, pentaerythritol tetraacrylates, ethoxylated pentaerythritol tetraacrylates, propoxylated pentaerythritol tetraacrylates, trimethylolpropane tetracrylates, dipentaerythritol hexaacrylates, but the disclosure is not limited thereto.

In an embodiment, examples of the epoxy resin monomers may comprise, but not limited to, bisphenol A epoxy resin monomers, bisphenol F epoxy resin monomers, bisphenol AD epoxy resin monomers, hydrogenated bisphenol A epoxy resin monomers, hydrogenated bisphenol AD epoxy resin monomers, and naphthalene epoxy resin monomers. Examples of the siloxane monomers may comprise, but not limited to, 3-(methacryloyloxypropyl)-tris(trimethylsiloxy) silanes (TRIS), dimethyl capped dimethyl siloxanes, dimethylvinylated silicas, dimethyl silicone oil, and methylhydrosiloxanes. In an embodiment, the cross-linkable monomer may comprise acrylic monomers, epoxy resin monomers, siloxane monomers, or a combination thereof.

The quantum dots 101 may be made from any suitable material. In an embodiment, the quantum dots 101 may comprise an inorganic conductor material or an inorganic semiconductor material. Examples of the inorganic semiconductor material comprise, but not limited to, Group II-VI, Group III-V, Group IV-VI, and Group IV semiconductor materials. Specific examples of the inorganic semiconductor material comprise, but not limited to, Si, Ge, Sn, Se, Te, B, C (including diamond), P, BN, BP, BAs, AlN, AlP, AlAs, AlSb, GaN, GaP, GaAs, Ga GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, CuInS, CuInSe, and CdZnSSe The quantum dots made from the above materials can be used individually or in combination. In an embodiment, the quantum dots 101 comprise CdSe, CdTe, CdS, ZnSe, CdTe, CuInS, InP, CuInSe, CdZnSSe, or a combination thereof. In an embodiment, the quantum dots 101 comprise CdSe. In an embodiment, the quantum dots 101 having core-shell structures.

In some embodiments, the surface of the quantum dot may be modified with ligands. The ligands formed on the surface of the quantum dot 101 may comprise a ligand that can cross-link with a cross-linkable monomer of the matrix 103. In an embodiment, the ligand may comprise one or more crosslinkable functional groups and a thiol group, an amine group and/or a carboxylic acid group. In an embodiment, the ligands comprise an acrylic monomer containing a thiol group, an amine group and/or a carboxylic acid group and one or more cross-linkable functional groups, an epoxy resin monomer, a silane monomer, a siloxane monomer or a combination of the foregoing groups, or any combination of the foregoing monomers. Examples of acrylic monomers herein may comprise, but are not limited to, acrylate based monomers, monomethyl cis-butenedioic acid, monomethyl itaconic acid, monomethyl trans-butenedioic acid, styrene, and triallyl isocyanurate (TAIC). Examples of the acrylate based monomers may comprise, but are not limited to, an acrylic acid (AA), a glycidyl methacrylate (GMA), a methyl acrylate, a methyl methacrylate (MMA), an ethyl acrylate (EA), an isobornyl acrylate (IBOA), an isooctyl acrylate, a butyl acrylate, a butyl methacrylate, an ethyl hexyl acrylate, a 2-hydroxyethyl acrylate (2-HEA), and a 1,12-dodecanediol dimethacrylate. In an embodiment, the ligand may be represented by formula (I): $X\text{-}R^1\text{-}R^2$.

In Formula (I), X represents a thiol group (—SH), an amine group (—NH$_2$), and/or a carboxylic acid group (—COOH); $R^1$ represents a substituted or unsubstituted $C_{1-20}$ alkylene group; and $R^2$ represents a cross-linkable functional group. Examples of the cross-linkable functional group may comprise, but not limited to, a vinyl group, an allyl group, a siloxane group, and a cyclooxy group. In an embodiment, $R^1$ may represent a substituted $C_{1-20}$ alkylene group wherein at least one substituent group is a cross-linkable functional group.

The unsubstituted $C_{1-20}$ alkyl group used herein refers to a straight or branched aliphatic hydrocarbon monovalent group having 1 to 20 carbon atoms in the main carbon chain thereof, and non-limiting examples thereof comprise, but not limited to, a methyl group, an ethyl group, a propyl group, an isobutyl group, a sec-butyl group, a tert-butyl group, a pentyl group, an isopentyl group, and a hexyl group. The unsubstituted $C_{1-20}$ alkylene group used herein refers to a divalent group having the same structure as $C_{1-20}$ alkyl group. Non-limiting examples of the unsubstituted $C_{1-20}$ alkylene group comprise, but not limited to, a methylene group, an ethylene group, a propylene group, an isobutylene group, a sec-butylene group, a tert-butylene group, a pentylene group, an isopentylene group, and a hexylene group.

The substituted $C_{1-20}$ alkyl group used herein refers to a group in which at least one hydrogen in the unsubstituted $C_{1-20}$ alkyl group is substituted by a substituent group. The substituted $C_{1-20}$ alkylene group used herein refers to a group in which at least one hydrogen in the unsubstituted $C_{1-20}$ alkylene group is substituted by a substituent group. The substituent group may be a substituted or unsubstituted $C_{1-20}$ alkyl group, a cross-linkable functional group, or a combination thereof.

The hybrid luminescence conversion particle 10 of the present disclosure is formed by a granulation process after crosslinking the ligand formed on the surface of the quantum dot 101 with the cross-linkable monomer of the matrix 103. Therefore, the hybrid luminescence conversion particle 10 of the present disclosure has characteristics of high crosslinking property, high temperature resistance, or high acid and alkali resistance. The quantum dot 101 in the hybrid luminescence conversion particle 10 can be protected from water and/or oxygen. Therefore, the stability of the quantum dot 101 could be improved. In addition, by forming the hybrid luminescence conversion particle 10, ligands stripping from the surface of the quantum dot 101 due to catalysts, water, or an acidic environment in a subsequent formation process for the first cladding material 12 can be prevented. Therefore, the surface of the quantum dot can be protected and prevented from damage while the quantum efficiency and the luminescence of the quantum dot can be maintained.

The first cladding material 12 comprises silicon oxide. In some embodiments, the first cladding material 12 can be formed on the hybrid luminescence conversion particle 10 in a layer structure and clad the entire hybrid luminescence conversion particle 10, as shown in FIG. 1. In an embodiment, the first cladding material 12 may be a silicon oxide ($SiO_2$) layer formed on the hybrid luminescence conversion particle 10 by an acid/base two-step process. Specifically, the first cladding material 12 can be formed by generating a silica sol on the hybrid luminescence conversion particle 10 in an acidic catalytic condition. The silica sol tends to form a linear chain structure in the acidic catalytic condition. An alkaline compound is added into the solution to make pH of the solution greater than 7. The silica sol tends to form in granular form in an alkaline condition. The silica sol formed in the alkaline condition and the silica sol formed in the acidic catalytic condition will interact with each other. Therefore, the nanostructure of the silicon oxide sol will be changed, and a dense silicon oxide layer may be formed on the hybrid luminescence conversion particle 10. The ratio α (absorbance ratio α: $A_{939}/A_{1000-1150}$) of the absorbance at 939 $cm^{-1}$ ($A_{939}$) to the absorbance peak at 1000-1150 $cm^{-1}$ ($A_{1000-1150}$) in the FTIR spectrum of the above-mentioned silicon oxide layer, which is used as the first cladding material 12, can be less than or equal to 0.8.

In an embodiment, the first cladding material 12 having a layer structure may have a thickness of about 20-2000 nm. In another embodiment, the first cladding material 12 having a layer structure may have a thickness of about 50-1500 nm, 50-1000 nm, 100-1000 nm, 150-1750 nm, 150-900 nm, 75 nm, 125 nm, 250 nm, 300 nm, 350 nm, 400 nm, 450 nm, 550 nm, 650 nm, 850 nm, 1050 nm, 1250 nm, 1000 nm, 150-1750 nm, 150-900 nm, 75 nm, 125 nm, 250 nm, 300 nm, 350 nm, 400 nm, 450 nm, 550 nm, 650 nm, 850 nm, 1050 nm, 1250 nm, 1450 nm, 1650 nm, 1850 nm, but the present disclosure is not limited thereto. In the embodiment, when the thickness of the first cladding material 12 is too thin, for example, less than 50 nm, the first cladding material 12 may not be able to prevent the quantum dots 101 in the hybrid luminescence conversion particle 10 from being degraded due to water and/or oxygen effectively. When the thickness of the first cladding material 12 is too thick, for example, greater than 2000 nm, the quantum efficiency of the luminescence conversion material 1 may be decreased.

The second cladding material 14 comprises metal oxides. In some embodiments, the second cladding material 14 can be formed on the first cladding material 12 in a layer structure and clad the hybrid luminescence conversion particle 10 and the first cladding material 12, as shown in FIG. 1. In an embodiment, the second cladding material 14 may be a metal oxide layer formed on the hybrid luminescence conversion particle 10 by an atomic layer deposition process. A metal oxide layer formed by an atomic layer deposition process may have the advantage of being thin and dense. Examples of the metal oxide layers may comprise, but not limited to, an alumina ($Al_2O_3$) layer. In an embodiment, the second cladding material 14 having a layer structure may have a thickness of about 5-50 nm. In another embodiment, the second cladding material 14 may have a thickness of about 5-45 nm, 5-40 nm, 10-40 nm, or 10-30 nm, but the present disclosure is not limited thereto. When the thickness of the second cladding material 14 is too thin, for example, less than 5 nm, the second cladding material 14 may not prevent the quantum dots 101 in the hybrid luminescence conversion particle 10 from being degraded due to water and/or oxygen effectively. When the thickness of the second cladding material 14 that is too thick, for example, greater than 50 nm, the quantum efficiency of the luminescence conversion material 1 may be decreased.

In some embodiments, a stacked layer structure may be further formed on the second cladding material 14 of the luminescence conversion material 1 to clad the second cladding material 14. The stacked layer structure may fill surface defects of the luminescence conversion material 1 of FIG. 1. Therefore, the water resistance and the oxygen resistance of the luminescence conversion material can be further improved. The stacked layer structure comprises a plurality of layers of the first cladding material and the second cladding material stacked in an alternating order. The thickness of the first cladding material in the stacked layer structure can be about 10-100 nm, 10-90 nm, 10-80 nm, 10-70 nm, 10-60 nm, 10-50 nm, 10-40 nm, 10-30 nm, 15-100 nm, 15-90 nm, 15-80 nm, 15-70 nm, 15-60 nm, 15-50 nm, 15-40 nm, 15-30 nm, but the disclosure is not limited thereto. The thickness of the second cladding material in the stacked layer structure may be about 5-20 nm, 5-15 nm, 5-10 nm, 5-9 nm, 5-8 nm, 6-20 nm, 6-15 nm, 6-10 nm, but the present disclosure is not limited thereto. In some embodiments, the stacked layer structure contains 3 or fewer layers of the first cladding material and 3 or fewer layers of the second cladding material. When the stacked layer structure contains more than 3 layers of the first cladding material or more than 3 layers of the second cladding material, the luminescence of the luminescence conversion material will be decreased and the manufacturing cost of the luminescence conversion material will be increased.

Figure 2:
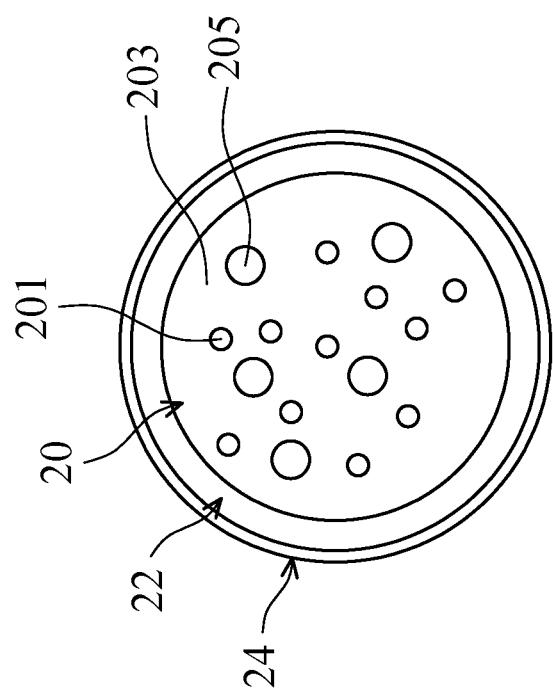
FIG. 2 illustrates a schematic view of a luminescence conversion material according to some other embodiments of the present disclosure.

FIG. 2 illustrates a schematic view of a luminescence conversion material 2 according to some other embodiments of the present disclosure. Similar to the luminescence conversion material 1, the luminescence conversion material 2 comprises a hybrid luminescence conversion particle 20, a first cladding material 22 cladding the hybrid luminescence conversion particle 20, and a second cladding material 24 formed on the first cladding material 22 and cladding the hybrid luminescence conversion particle 20 and the first cladding material 22. The first cladding material 22 and the second cladding material 24 of the luminescence conversion material 2 are the same as the first cladding material 12 and the second cladding material 14 of the luminescence conversion material 1. The difference between the luminescence conversion material 2 and the luminescence conversion material 1 is that the hybrid luminescence conversion particle 20 further comprises diffusion particles 205. Therefore, only the hybrid luminescence conversion particle 20 of the luminescence conversion material 2 will be described in detail below, and the first cladding material 22 and the second cladding material 24 of the luminescence conversion material 2 will not be described again.

As shown in FIG. 2, the hybrid luminescence conversion particle 20 may comprise a matrix 203, a plurality of quantum dots 201 uniformly dispersed in the matrix 203, and diffusion particles 205. In an embodiment, the hybrid luminescence conversion particle 20 may have a particle size of about 0.1-40 µm. In another embodiment, the hybrid luminescence conversion particle 20 may have a particle size of about 0.2-38 µm, 0.5-35 µm, 1-32 µm, 2-30 µm, 5-25 µm, 7.5 µm, 10 µm, 12.5 µm, 15 µm, 20 µm, 25 µm, or 32.5 µm, but the present disclosure is not limited thereto. When the particle size of the hybrid luminescence conversion particle 20 exceeds 40 µm, the light output efficiency of the hybrid luminescence conversion particle 20 will be decreased, and a light output surface of a luminescent element containing the hybrid luminescence conversion particle 20 may have uneven brightness which may result in uneven brightness lines or spots visible to naked eye. Based on the fact that the total weight of the hybrid luminescence conversion particle 20 is 100 wt %, the content of the matrix 203 may be about 30-89 wt %, the content of the quantum dots 201 may be about 5-50 wt %, and the content of the diffusion particles 205 may be about 0.5-20 wt %. In another embodiment, the content of the matrix 203 may be about 30-80 wt %, the content of the quantum dots 201 may be about 15-50 wt %, and the content of the diffusion particles 205 may be about 1-15 wt %. In another embodiment, the content of the matrix 203 may be about 30-70 wt %, the content of the quantum dots 201 may be about 20-50 wt %, and the content of the diffusion particles 205 may be about 1-10 wt %. In another embodiment, the content of the matrix 203 may be about 30-60 wt %, the content of the quantum dots 201 may be about 10-40 wt %, and the content of the diffusion particles 205 may be about 1-10 wt %. When the content of the quantum dots 201 in the hybrid luminescence conversion particle 20 is too low, the hybrid luminescence conversion particle 20 may not provide a desired converted color. When the content of the quantum dots 201 in the hybrid luminescence conversion particle 20 is too high, the quantum dots 201 will suffer from self-absorption which lead a need to use more quantum dots 201. When the content of the matrix 203 in the hybrid luminescence conversion particle 20 is too low, the degree of crosslinking between the matrix 203 and the quantum dots 201 is insufficient. Therefore, the produced hybrid luminescence conversion particle 20 cannot provide good protection for the quantum dots 201. When the content of the matrix 203 in the hybrid luminescence conversion particle 20 is too high, the content of the quantum dots 203 will be too low, so that the hybrid luminescence conversion particle 20 may not provide a desired converted color.

The matrix 203 may comprise a resin comprising a cross-linkable monomer. The materials that can be used to form the matrix 203 are the same as the materials that can be used to form the matrix 103, and thus, the materials of the matrix 203 are not repeated herein. The quantum dots 201 may be made from any suitable material. The materials that can be used to form the quantum dots 201 are the same as the materials that can be used to form the quantum dots 101, and thus, the materials of the quantum dots 201 are not repeated herein. The ligand formed on the surface of the quantum dot 201 may comprise a ligand that is able to crosslink with the cross-linkable monomer of the matrix 203. Similarly, depending on the material of the matrix 203, the ligands that can be formed on the surface of the quantum dot 201 may be the same as the ligands that can be formed on the surface of the quantum dot 101, and thus, the ligands on the quantum dot 201 are not repeated herein.

The diffusion particles 205 may comprise metal oxides, silicon oxides, or a combination thereof. Examples of the metal oxides in the diffusion particles 205 may comprise, but not limited to, titanium oxide and zirconium oxide. In an embodiment, the diffusion particles 205 may have a particle size of about 10-500 nm. In another embodiment, the diffusion particles 205 may have a particle size of about 10-450 nm, 10-400 nm, 15-350 nm, 15-300 nm, 20-250 nm, 25-250 nm, 20-200 nm, or 25-250 nm, but the present disclosure is not limited thereto. When the particle size of diffusion particles 205 is less than or equal to 500 nm, the diffusion efficiency of the diffusion particles 205 in a visible light range is best. When the particle size of diffusion particle 205 is less than 10 nm, the diffusion particle 205 is unable to diffuse light. When the particle size of diffusion particle 205 exceeds 500 nm, the diffusion particle 205 may cause a light-shading effect and reduce the light efficacy of hybrid luminescence conversion particle 20. The luminescence conversion material 2 may have better optical properties by further including the diffusion particle 205 in the hybrid luminescence conversion particle 20.

The hybrid luminescence conversion particle 20 of the luminescence conversion material 2 is formed by a granulation process after crosslinking the ligand formed on the surface of the quantum dot 201 with the cross-linkable monomer of the matrix 203. Similar to the hybrid luminescence conversion particle 10 of the luminescence conversion material 1, the hybrid luminescence conversion particle 20 of the luminescence conversion material 2 has characteristics of high crosslinking property, high temperature resistance or acid and alkali resistance. The quantum dots 201 in the hybrid luminescence conversion particle 20 can be blocked from water and/or oxygen, and the stability of the quantum dots 201 can be improved. Similarly, a stacked layer structure may be further formed on the second cladding material 24 of the luminescence conversion material 2 to clad the second cladding material 24. The material and structure of the stacked layer structure are as above, so it will not be repeated herein.

Figure 3:
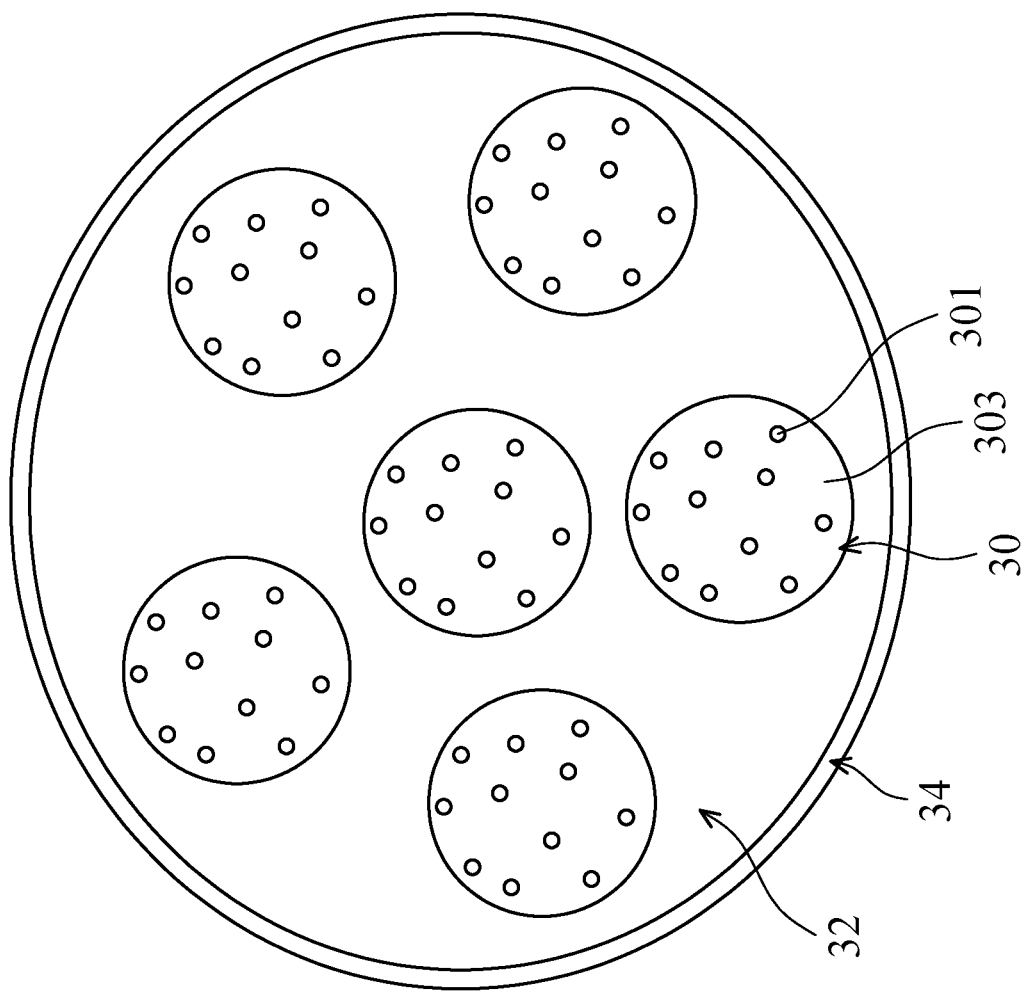
FIG. 3 illustrates a schematic view of a luminescence conversion material according to some other embodiments of the present disclosure.

FIG. 3 illustrates a schematic view of a luminescence conversion material 3 according to some other embodiments of the present disclosure. The luminescence conversion material 3 comprises a hybrid luminescence conversion particle 30, a first cladding material 32 encapsulating the hybrid luminescence conversion particle 30, and a second cladding material 34 formed on the first cladding material 32 and cladding the hybrid luminescence conversion particle 30 and the first cladding material 32. Similarly, in some embodiments, a stacked layer structure may be further formed on the second cladding material 34 of the luminescence conversion material 3 to clad the second cladding material 34. The hybrid luminescence conversion particle 30 may comprise a matrix 303 and a plurality of quantum dots 301 uniformly dispersed in the matrix 303. In the embodiment, the first cladding material 32 may encapsulate a plurality of hybrid luminescence particles 30 and form a spherical encapsulation structure with the hybrid luminescence conversion particle 30. The hybrid luminescence conversion particles 30 may be uniformly dispersed in the spherical encapsulation structure. The hybrid luminescence conversion particle 30 may have a particle size of about 0.1-5 µm. In another embodiment, the luminescence conversion particle 30 may have a particle size of about 0.2-4.8 µm, 0.3-4.5 µm, 0.5-5 µm, 1-5 µm, 1.5-4.5 µm, 1.8-3.8 µm, 2 µm or 3.6 µm, but the present disclosure is not limited thereto. The particle size of the spherical encapsulation structure may be about 0.1-40 µm, for example, about 0.2-38 µm, 0.5-35 µm, 1-32 µm, 2-30 µm, 5-25 µm, 7.5 µm, 10 µm, 12.5 µm, 15 µm, 20 µm, 25 µm, or 32.5 µm, but the present disclosure is not limited thereto. The second cladding material 34 having a layer structure with a thickness of about 5-50 nm may be formed on the spherical encapsulation structure to clad the hybrid luminescence conversion particle 30 and the first cladding material 32. In an embodiment, the thickness of the second cladding material 34 may be about 5-50 nm. In another embodiment, the second cladding material 34 may have a thickness of about 5-45 nm, 5-40 nm, 10-40 nm, or 10-30 nm, etc., but the present disclosure is not limited thereto. Except to the spherical encapsulation structure mentioned above, the luminescence conversion material 3 has a similar structure, preparation method, particle size, composition, and stacked layer structure as the luminescence conversion material 1. Therefore, these contents are not repeated.

Figure 4:
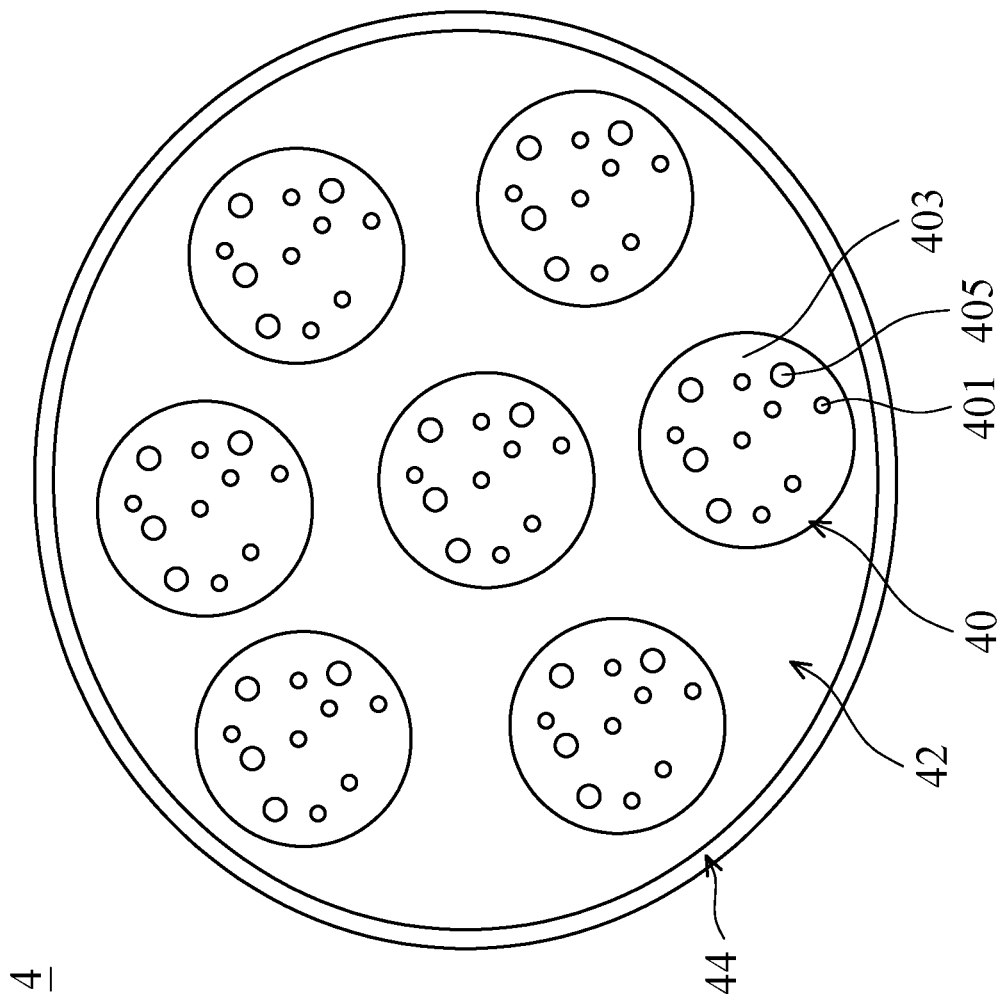
FIG. 4 illustrates a schematic view of a luminescence conversion material according to some other embodiments of the present disclosure.

FIG. 4 illustrates a schematic view of a luminescence conversion material 4 according to some other embodiments of the present disclosure. The luminescence conversion material 4 comprises a hybrid luminescence conversion particle 40, a first cladding material 42 encapsulating the hybrid luminescence conversion particle 40, and a second cladding material 44 formed on the first cladding material 42 and cladding the hybrid luminescence conversion particle 40 and the first cladding material 42. Similarly, in some embodiments, a stacked layer structure may be further formed on the second cladding material 44 of the luminescence conversion material 4 to clad the second cladding material 44. The hybrid luminescence conversion particle 40 may comprise a matrix 403 and a plurality of quantum dots 401 and diffusion particles 405 uniformly dispersed in the matrix 403. In the embodiment, the first cladding material 42 may encapsulate a plurality of hybrid luminescence particles 40 and form a spherical encapsulation structure with the hybrid luminescence conversion particle 40. The hybrid luminescence conversion particles 40 may be uniformly dispersed in the spherical encapsulation structure. The hybrid luminescence conversion particle 40 may have a particle size of about 0.1-5 μm. In another embodiment, the luminescence conversion particle 40 may have a particle size of about 0.2-4.8 μm, 0.3-4.5 μm, 0.5-5 μm, 1-5 μm, 1.5-4.5 μm, 1.8-3.8 μm, 2 μm or 3.6 μm, etc., but the present disclosure is not limited thereto. The particle size of the spherical encapsulation structure may be about 0.1-40 μm, for example, about 0.2-38 μm, 0.5-35 μm, 1-32 μm, 2-30 μm, 5-25 μm, 7.5 μm, 10 μm, 12.5 μm, 15 μm, 20 μm, 25 μm, or 32.5 μm, but the present disclosure is not limited thereto. The second cladding material 44 having a layer structure with a thickness of about 5-50 nm may be formed on the spherical encapsulation structure to clad the hybrid luminescence conversion particle 40 and the first cladding material 42. In an embodiment, the thickness of the second cladding material 44 may be about 5-50 nm. In another embodiment, the second cladding material 44 may have a thickness of about 5-45 nm, 5-40 nm, 10-40 nm, or 10-30 nm, etc., but the present disclosure is not limited thereto. Except to the spherical encapsulation structure mentioned above, the luminescence conversion material 4 has a similar structure, preparation method, particle size, composition, and stacked layer structure as the luminescence conversion material 2. Therefore, these contents are not repeated.

The luminescence conversion materials 1-4 illustrated in FIGS. 1 to 4 are used as examples for illustrating the luminescence conversion material of the present disclosure, but the luminescence conversion materials of the present disclosure are not limited to the luminescence conversion materials 1-4 illustrated in FIGS. 1 to 4. For example, in an embodiment, the first cladding material of the luminescence conversion material may encapsulate both the hybrid luminescence conversion particle 2 containing diffusion particles and the hybrid luminescence conversion particle 1 not containing diffusion particles.

Some embodiments of the present disclosure provide a display device comprising the aforementioned luminescence conversion material.

Some embodiments of the present disclosure provide a luminescence device comprising the aforementioned luminescence conversion material.

Figure 5:
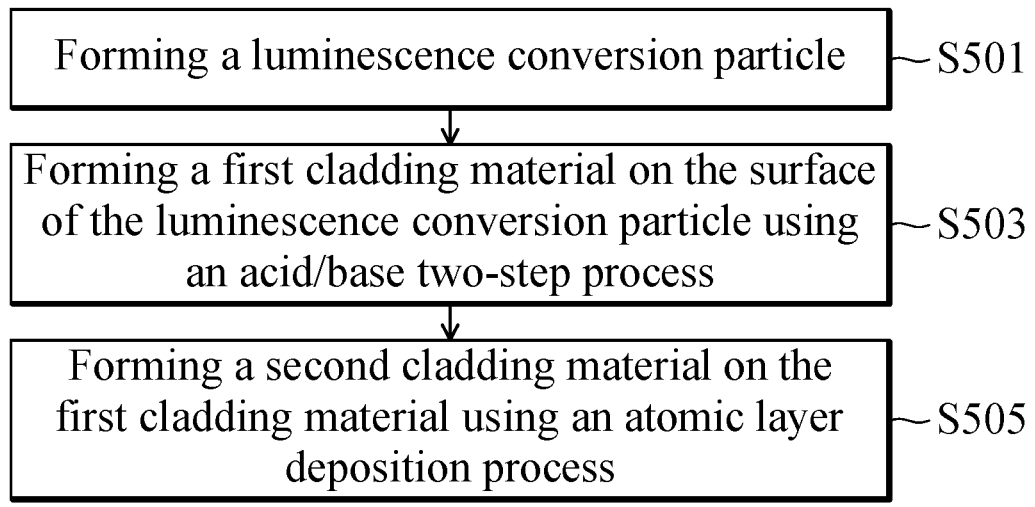
FIG. 5 illustrates a flowchart of a fabrication method of a luminescence conversion material according to some embodiments of the present disclosure.

Some embodiments of the present disclosure provide a fabrication method of a luminescence conversion material. FIG. 5 illustrates a flowchart of a fabrication method 5 of a luminescence conversion material according to some embodiments of the present disclosure. As shown in FIG. 5, the fabrication method 5 of the luminescence conversion material comprises: a step S501 of forming a hybrid luminescence conversion particle; a step S503 of forming a first cladding material on the surface of the hybrid luminescence conversion particle in an acid/base two-step process; and a step S505 of forming a second cladding material on the first cladding material in an atomic layer deposition process.

In step S501, selecting a ligand which is able to crosslink with a cross-linkable monomer of a matrix according to the cross-linkable monomer of the matrix; modifying the ligand on a quantum dot to obtain a modified quantum dot; mixing the modified quantum dot, the matrix and an initiator thoroughly to obtain a luminescence conversion material mixture; applying light or heat to the luminescence conversion material mixture to cross link the modified quantum dot with the matrix in the luminescence conversion material mixture; centrifugal washing the product resulted from the cross-linking reaction with a solvent after the cross-linking reaction to obtain the hybrid luminescence conversion particle of the present disclosure. In an embodiment, the luminescence conversion material mixture may further contain diffusion particles.

In step S503, a silicon oxide layer with a thickness of 50-2000 nm is formed on the hybrid luminescence conversion particle obtained in step S501 by an acid/base two-step process. Step S503 can be repeated several times until the desired thickness of the silicon oxide layer is achieved. The silicon oxide layer is used as the first cladding material to clad the entire hybrid luminescence conversion particle. Analyzing the first cladding material by FTIR. In the FTIR spectrum of the first cladding material, the ratio α (absorbance ratio α: $A_{939}/A_{1000-1150}$) of the absorbance at 939 cm$^{-1}$ ($A_{939}$) to the absorbance peak at 1000-1150 cm$^{-1}$ ($A_{1000-1150}$) is less than or equal to 0.8.

In step S505, a metal oxide layer with a thickness of 5-50 nm is formed on the first cladding material by an atomic layer deposition process. Step S505 can be repeated several times until the metal oxide layer with the desired thickness is achieved. The preparation of the luminescence conversion material is completed after Step S505. The metal oxide layer formed by an atomic layer deposition process has characteristics of thin and dense, and thus, it can provide a water resistance and an oxygen resistance while maintaining a light output efficiency of the hybrid luminescence conversion particle. The final luminescence conversion material may have a structure as one of that shown in FIGS. 1 to 4 above, but the present disclosure is not limited thereto. For example, step S503 and/or step S505 may be repeated several times to form a stacked layer structure on the second cladding material and cladding the second cladding material. In an embodiment, step S503 and/or step S505 may be repeated no more than 3 times, e.g., 1 time, 2 times, or 3 times.

Specific examples and comparative examples are provided below for further illustrating the advantages of the luminescence conversion material of the present disclosure.

Quantum Dot Synthesis

Quantum Dot Synthesis Example 1

0.9 g of indium (III) chloride, 2.2 g of zinc(II) chloride and 30 mL of oleylamine were added to a 150 mL three-necked flask to form a mixture. The mixture was heated to 120° C. under vacuum and maintained for 1 hour, then the mixture was heated to 180° C. and maintained for 10 minutes. 4.5 g of tris(diethylamino)phosphine was added into the mixture and reacted for 8 minutes, then 10 g of dodecanethiol was added into the mixture and the mixture was heated to 260° C. for 5 hours. 2 g of 2-Ethylhexanoic acid was added into the mixture after lowering the temperature to 180° C. The temperature was cooled down to room temperature after 1 hour of heating to obtain a reaction solution. The reaction solution, toluene and 95% ethanol were added into a centrifuge tube and repeatedly centrifuged for 10 minutes at 6000 rpm. Finally, toluene and 95% ethanol were dried by concentrating under reduced pressure to obtain quantum dot powder 1, which has a InP/ZnS core-shell structure.

Quantum Dot Synthesis Example 2

12 mmol of zinc acetate ($Zn(CH_3COO)_2$), 0.864 mol of cadmium oxide (CdO) and 47.5 mol of octadecylphosphonic acid were mixed to obtain a mixture. The mixture was heated to 120-160° C. to obtain a mixed solution. 20 mL of tri-n-octylphosphine solution was added into the mixed solution, and then the mixed solution was heated to 250-270° C. When the temperature of the mixed solution reached 250-270° C., 6 mL of tri-n-octylphosphine solution, 10.68 mmol of sulfur, and 0.3 mmol of selenium were added to the mixed solution rapidly, thereby conducting a reaction. The mixed solution was cooled down naturally after 10 minutes after the reaction to obtain cadmium selenide (CdSe@ZnS) quantum dots. The CdSe quantum dots were washed with toluene. 95% ethanol was added to precipitate out the CdSe quantum dots, and then the supernatant was removed. The CdSe quantum dots were dispersed in toluene and then 95% ethanol was added. The centrifugal washing process was repeated for 3 times, and quantum dot powder 2, which has a CdSe/ZnS core-shell structure were obtained after drying.

Preparation of Luminescence Conversion Material

Example 1

1. Preparation of Hybrid Luminescence Conversion Particle

Quantum dot powder 1, isobornyl acrylate (IBOA), and 2,4,6-trimethylbenzoyl diphenylphosphine oxide (trade name Lucirin TPO, manufactured and sold by BASF) were mixed together to obtain a mixed solution, wherein a weight ratio of quantum dot powder 1: IBOA:2,4,6-trimethylbenzoyl diphenylphosphine oxide is 30:69:1. The mixed solution was rapidly stirred and an aqueous cetyltrimethylammonium bromide (CTAB) solution (a weight ratio of water: CTAB is 20:0.5) was added to the mixed solution. The mixed solution was irradiated with UV LED light of wavelength 365 nm to conduct a crosslink reaction. Finally, centrifugal washing the product resulted in the crosslink reaction with 95% ethanol to complete the preparation of hybrid luminescence conversion particles.

2. Formation of First Cladding Material 0.5 g of the hybrid luminescence conversion particles were dispersed in 20 g of water, 5 g of 95% ethanol, and 5 g of tetraethoxysilane reactant to form a mixed solution. The pH of the mixed solution was adjusted to 5-5.5 with hydrochloric acid (HCl) and then the mixed solution was stirred rapidly for 2 hours at 40° C. The pH was adjusted to 11-11.5 with sodium hydroxide (NaOH). A reaction was conducted at 60° C. for 12 hours, then the mixed solution was heated to 90° C. and a reaction was conducted for 1 hour. Cooling the product resulted from the reaction above, centrifugal washing the product with 95% ethanol and drying the product in an oven at 120° C. for 1 hour to obtain hybrid luminescence conversion particles, wherein each of the hybrid luminescence conversion particles was cladded with a silica oxide layer.

3. Formation of Second Cladding Material

The hybrid luminescence conversion particles cladded with the silicon oxide layers were placed in a chamber of an atomic layer deposition (ALD) device. The chamber was evacuated and heated to 80° C. Trimethyl aluminum gas was introduced by a carrier gas, nitrogen gas, and the trimethyl aluminum gas is adsorbed onto the hybrid luminescence conversion particles cladded with the silicon oxide layers. Nitrogen ($N_2$) was introduced to remove excess trimethyl aluminum and by-products. Water vapor was introduced into the chamber by a carrier gas, nitrogen gas, the water vapor was adsorbed onto the surface of the first precursor (trimethyl aluminum) and reacted with the first precursor. Nitrogen ($N_2$) was introduced again to remove the excess water vapor and by-products. The above cycle was repeated 50 times to obtain 5 nm $Al_2O_3$ as a second cladding material, and the preparation of luminescence conversion materials were completed.

Example 2

The luminescence conversion materials were obtained in the same manner as in Example 1 except that in the step of forming the second cladding material, the cycle was repeated 100 times to form 10 nm $Al_2O_3$.

Example 3

The luminescence conversion materials were obtained in the same manner as in Example 1 except that in the step of forming the second cladding material, the cycle was repeated 300 times to form 30 nm $Al_2O_3$.

Example 4

The luminescence conversion materials were obtained in the same manner as in Example 2 except that the hybrid luminescence conversion particles were dispersed in 20 g of water, 5 g of 95% ethanol, and 10 g of tetraethoxysilane reactant to form a mixed solution.

Example 5

The luminescence conversion materials are obtained in the same manner as in Example 3, except that the quantum dot powder 1 was replaced with the quantum dot powder 2.

Example 6

The luminescence conversion materials were obtained in the same manner as in Example 1 except that the IBOA was replaced with a monomeric mixture of IBOA and 1,12-dodecanediol dimethacrylate (1,12-DODECA) in a weight ratio of 1:1.

Example 7

1. Preparation of Diffusion Particle 2 g of titanium oxide (Product No. TO-020, purchased from DOITTECHNICAL CO., LIMITED) and 10 g of 3-(trimethoxysilyl)propyl methacrylate (MSMA) were mixed in 95% ethanol and stirred rapidly to obtain a mixture. 0.5 g of NaOH (0.1 M) was added into the mixture and the mixture was stirred for 3 hours. Titanium oxide modified particles were obtained after centrifugal washing the mixture with 95% ethanol.

2. Preparation of Hybrid Luminescence Conversion Particle

The quantum dot powder 1, the titanium oxide modified particles, methyl methacrylate (MMA), 1,12-dodecanediol dimethacrylate, and 2,4,6-trimethylbenzoyl diphenylphosphine oxide (Trade Name: Lucirin TPO, manufactured and sold by BASF) were mixed to obtain a mixed solution, wherein a weight ratio of quantum dot powder 1: titanium oxide modified particles: MMA: 1,12-dodecanediol dimethacrylate: 2,4,6-trimethylbenzoyl diphenylphosphine oxide was 15:20:40:23:2. Aqueous cetyltrimethylammonium bromide (CTAB) solution (the weight ratio of water: CTAB was 20:0.5) was added into the mixed solution while the mixed solution was rapidly stirred and irradiated with UV LED light of wavelength 365 nm to conduct a crosslinking reaction. Finally, centrifugal washing the end products obtained from the crosslinking reaction with 95% ethanol and the preparation of hybrid luminescence conversion particles were completed.

2. Formation of First Cladding Material 2 g of the hybrid luminescence conversion particle was dispersed in 20 g of water, 5 g of 95% ethanol, and 5 g of tetraethoxysilane reactant to form a mixed solution. The pH of the mixed solution was adjusted to 5-5.5 with hydrochloric acid (HCl) and then the mixed solution was stirred rapidly for 2 hours at 40° C. The pH was adjusted to 11-11.5 with sodium hydroxide (NaOH). A reaction was conducted at 60° C. for 12 hours, then the mixed solution was heated to 90° C. and a reaction was conducted for 1 hour. Cooling the product resulted from the reaction above, centrifugal washing the product with 95% ethanol and drying the product in an oven at 120° C. for 1 hour to obtain hybrid luminescence conversion particles, wherein each of the hybrid luminescence conversion particles was cladded with a silica oxide layer.

3. Formation of Second Cladding Material

The hybrid luminescence conversion particles cladded with the silicon oxide layers were placed in a chamber of an atomic layer deposition (ALD) device. The chamber was evacuated and heated to 80° C. Trimethyl aluminum gas was introduced by a carrier gas, nitrogen gas, and the trimethyl aluminum gas is adsorbed onto the hybrid luminescence conversion particle cladded with the silicon oxide layer. Nitrogen ($N_2$) was introduced to remove excess trimethyl aluminum and by-products. Water vapor was introduced into the chamber by a carrier gas, nitrogen gas, the water vapor was adsorbed onto the surface of the first precursor and reacted with the first precursor. Nitrogen was introduced again to remove the excess water vapor and by-products. The above cycle was repeated 300 times to obtain 30 nm $Al_2O_3$ as a second cladding material, and the preparation of luminescence conversion materials were completed.

Comparative Example 1

50 mg of quantum dot powder 2 was dispersed in 160 mL of cyclohexane to obtain a mixture. 20 mL of nonylphenol polyethoxylate (IGEPAL® CO 520) and ammonia were added into the mixture. After conducting a reaction at 60° C. for 12 h, methanol was added into the mixture for demulsification. The luminescence conversion material was obtained after a cooling process and a centrifugal washing process.

Comparative Example 2

Quantum dot powder 2, IBOA, and 2,4,6-trimethylbenzoyl diphenylphosphine oxide (Trade Name: Lucirin TPO, manufactured and sold by BASF) were mixed together to obtain a mixed solution, wherein the weight ratio of quantum dot powder 2:IBOA:2,4,6-trimethylbenzoyl diphenylphosphine oxide was 30:69:1. Aqueous cetyltrimethylammonium bromide (CTAB) solution (the weight ratio of water: CTAB was 20:0.5) was added into the mixed solution while the mixed solution was rapidly stirred and irradiated with UV LED light of wavelength 365 nm to conduct a crosslinking reaction. Finally, centrifugal washing the end products resulted from the crosslinking reaction with 95% ethanol and the preparation of hybrid luminescence conversion particles were completed.

Comparative Example 3

50 mg of quantum dot powder 1 was dispersed in 160 mL of cyclohexane to obtain a mixture. 20 mL of nonylphenol polyethoxylate (IGEPAL® CO 520) and ammonia were added into the mixture. After conducting a reaction at 60° C. for 12 h, methanol was added into the mixture for demulsification. The luminescence conversion materials were obtained after a centrifugal washing process.

Comparative Example 4

1 g of the quantum dot powder 2 was placed in a chamber of an atomic layer deposition (ALD) device. The chamber was evacuated and heated to 80° C. Trimethyl aluminum gas was introduced by a carrier gas, nitrogen gas, and the trimethyl aluminum gas was adsorbed onto the surface of the quantum dot powder 2. Nitrogen ($N_2$) was introduced to remove excess trimethyl aluminum and by-products. Water vapor was introduced into the chamber by a carrier gas, nitrogen gas, the water vapor was adsorbed onto the surface of the first precursor (trimethyl aluminum) and reacted with the first precursor. Nitrogen ($N_2$) was introduced again to remove the excess water vapor and by-products. The above cycle was repeated 300 times to obtain 30 nm $Al_2O_3$ as a second cladding material, and the preparation of luminescence conversion material was completed.

Comparative Example 5

1 g of the hybrid luminescence conversion particle of Example 1 was dispersed in 20 g of water, 5 g of 95% ethanol, and 5 g of tetraethoxysilane reactant to form a 20 g mixed solution. 5 g of aqueous NaOH solution (0.8 M) was added into the mixed solution. A reaction was conducted at 60° C. for 12 hours. The luminescence conversion materials were obtained after a cooling process and a centrifugal washing process.

The structures of the luminescence conversion materials of Examples 1-7 and Comparative Examples 1-5 are listed in Table 1 below. In Table 1, M-CdSe represents a modified CdSe quantum dots, CdSe represents an unmodified CdSe quantum dots, M-InP represents a modified InP quantum dots, InP represents an unmodified InP quantum dots, and $SiO_2\_2\times$ represents 2 times equivalent amount based of silicon.

TABLE 1

| | Quantum Dot | Matrix | First Cladding Material | Second Cladding Material |
|---|---|---|---|---|
| Example 1 | M-CdSe | IBOA | $SiO_2$ | 5 nm $Al_2O_3$ |
| Example 2 | M-CdSe | IBOA | $SiO_2$ | 10 nm $Al_2O_3$ |
| Example 3 | M-CdSe | IBOA | $SiO_2$ | 30 nm $Al_2O_3$ |
| Example 4 | M-CdSe | IBOA | $SiO_2$-2x | 10 nm $Al_2O_3$ |
| Example 5 | M-InP | IBOA | $SiO_2$ | 30 nm $Al_2O_3$ |
| Example 6 | M-CdSe | IBOA/ 1,12-DODECA | $SiO_2$ | 30 nm $Al_2O_3$ |
| Example 7 | M-CdSe | MMA/ 1,12-DODECA | $SiO_2$ | 30 nm $Al_2O_3$ |
| Comparative Example 1 | CdSe | — | $SiO_2$ | — |
| Comparative Example 2 | M-CdSe | IBOA | — | — |
| Comparative Example 3 | InP | — | $SiO_2$ | — |
| Comparative Example 4 | CdSe | — | — | 30 nm $Al_2O_3$ |
| Comparative Example 5 | M-CdSe | IBOA | $SiO_2$ | — |

Figure 6:
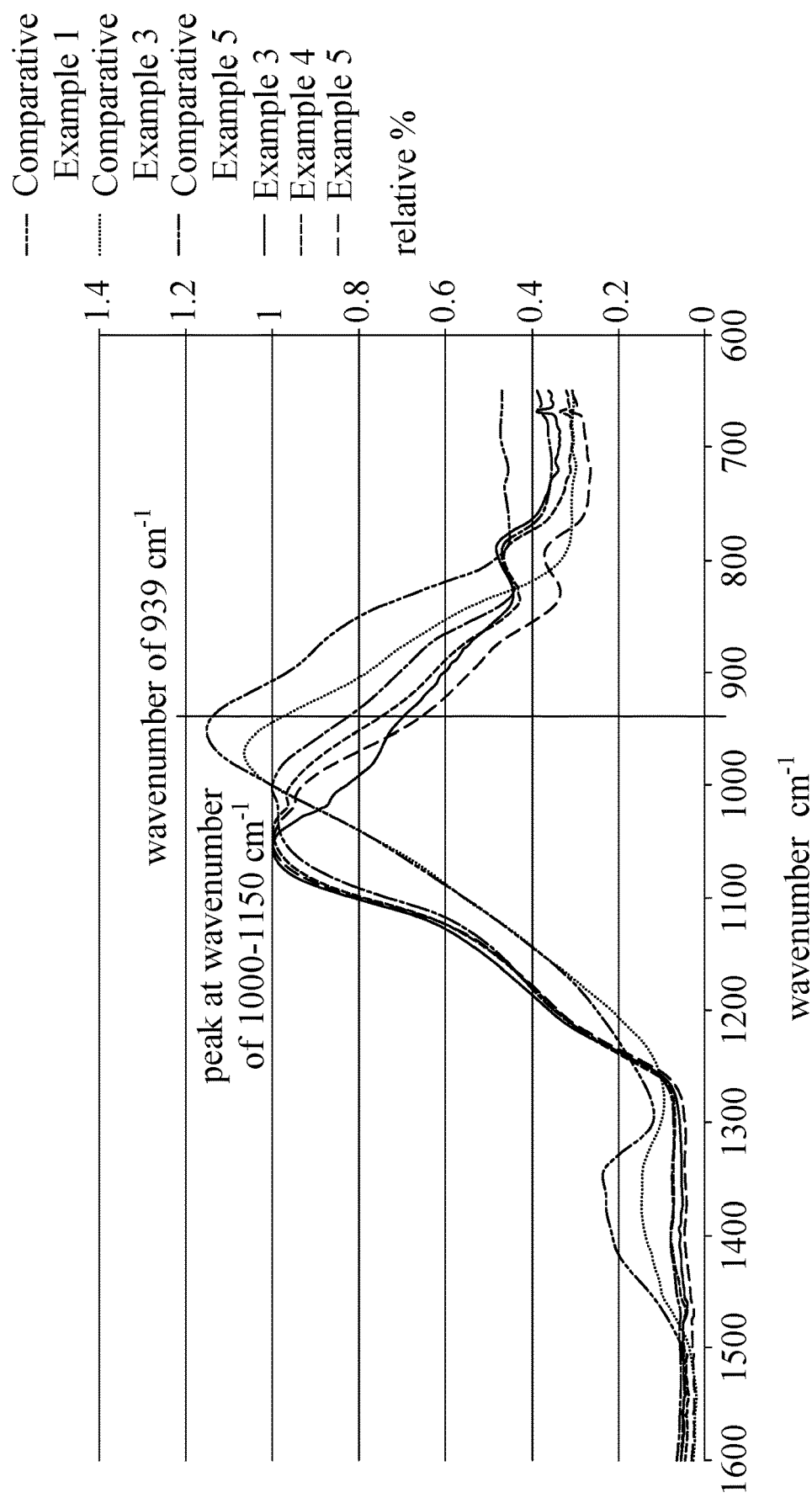
FIG. 6 illustrates a spectrum of Fourier-transform infrared spectroscopy (FTIR) of luminescence conversion materials according to some embodiments of the present disclosure and comparative examples.

The luminescence conversion materials of Examples 1-7 and Comparative Examples 1-5 were mixed with silicone to produce LEDs, wherein a weight ratio of the quantum dot powder:silicone is 20:80. Lighting the LEDs at 100 mA to evaluate the performance of the LEDs. The evaluation results are shown in Table 2 below. FIG. 6 illustrates a spectrum of FTIR of the first cladding materials of the luminescence conversion materials according to Examples 3-5 and Comparative Examples 1, 3 and 5. The ratio α (absorbance ratio α: $A_{939}/A_{1000-1150}$) of the absorbance at 939 cm$^{-1}$ ($A_{939}$) to the absorbance peak at 1000-1150 cm$^{-1}$ ($A_{1000-1150}$) in a Fourier-transform infrared spectroscopy (FTIR) spectrum of first cladding materials of the luminescence conversion materials according to Examples 3-5 and Comparative Examples 1, 3 and 5 are listed in Table 2. In the FTIR spectrum, a SI—OH bond absorbs light at wavenumber of 939 cm$^{-1}$ and a Si—O—Si bond absorbs light at wavenumber of 1000-1150 cm$^{-1}$. Therefore, the smaller the α value is, the lower the content of the Si—OH bond is included in the first cladding material, and the higher the structural density of the first cladding material is. The relative LED intensity@96 h indicates that a percentage of a luminous intensity of a LED lighted at 100 mA for 96 h relative to an initial luminous intensity of a LED lighted at 100 mA. The relative LED intensity@216 h indicates that a percentage of a luminous intensity of a LED lighted at 100 mA for 216 h relative to an initial luminous intensity of a LED lighted at 100 mA.

TABLE 2

| | α | Quantum Efficiency | Relative LED Intensity@96 h | Relative LED Intensity@216 h |
|---|---|---|---|---|
| Example 1 | — | 60% | 65% | 57% |
| Example 2 | — | 58% | 83% | 70% |
| Example 3 | 0.69 | 50% | 98% | 93% |
| Example 4 | 0.74 | 48% | 85% | 72% |
| Example 5 | 0.65 | 45% | 80% | 65% |
| Example 6 | — | 55% | 87% | 72% |
| Example 7 | — | 55% | 99% | 95% |
| Comparative Example 1 | 1.13 | 45% | 60% | 42% |
| Comparative Example 2 | — | 47% | 10% | — |
| Comparative Example 3 | 0.97 | 40% | 45% | 20% |
| Comparative Example 4 | — | 40% | 58% | 38% |
| Comparative Example 5 | 0.82 | 60% | 55% | 36% |

As can be seen from Table 2 above, compared to the luminescence conversion materials of the Comparative examples, the luminescence conversion materials of the present disclosure have improved service life. In particular, the LED including the luminescence conversion material containing the modified CdSe quantum dots and 30 nm $Al_2O_3$ can maintain more than 90% of the initial luminous intensity after lighting for 216 hours. That is, the luminescence conversion material of the present disclosure has an ability of protecting the quantum dots from oxidation or deterioration by moisture. The luminescence conversion material of the present disclosure has the effect of protecting the quantum dots in it from oxidation or deterioration by water vapor. Therefore, a display device and/or an luminescence device comprising the luminescence conversion material of the present disclosure may also have an improved service life.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A luminescence conversion material, comprising:
    a hybrid luminescence conversion particle, comprising:

a matrix, and
a plurality of quantum dots uniformly dispersed in the matrix;
a first cladding material cladding the hybrid luminescence conversion particle; and
a second cladding material, formed on the first cladding material and cladding the first cladding material,
wherein the first cladding material comprises a silicon oxide, and a ratio α (absorbance ratio α: $A_{939}/A_{1000\text{-}1150}$) of the absorbance at 939 cm$^{-1}$ ($A_{939}$) to the absorbance peak at 1000-1150 cm$^{-1}$ ($A_{1000\text{-}1150}$) in a Fourier-transform infrared spectroscopy (FTIR) spectrum of the first cladding material is less than or equal to 0.8.

2. The luminescence conversion material of claim 1, wherein a surface of each of the quantum dots is modified with a ligand, the matrix comprises a cross-linkable monomer, the ligand cross-links with the cross-linkable monomer, and the ligand is selected from a group consisting of an acrylic monomer containing a thiol group, an amine group and/or a carboxylic acid group, an epoxy resin monomer, a silane monomer, a siloxane monomer and any combination thereof, and the cross-linkable monomer is selected from a group consisting of acrylic monomers, epoxy resin monomers, siloxane monomers, and any combination thereof.

3. The luminescence conversion material of claim 1, wherein the second cladding material comprises metal oxide, the first cladding material has a layer structure, the second cladding material has a layer structure, a thickness of the layer structure of the first cladding material is 20-2000 nm, and a thickness of the layer structure of the second cladding material is 5-50 nm.

4. The luminescence conversion material of claim 3, wherein a particle size of the hybrid luminescence conversion particle is 0.1-40 μm, and a particle size of the luminescence conversion material is 0.2-50 μm.

5. The luminescence conversion material of claim 1, wherein the first cladding material and a plurality of the hybrid luminescence conversion particles form a spherical encapsulation structure, the second cladding material has a layer structure, a particle size of the spherical encapsulation structure is 0.1-40 μm, and a thickness of the layer structure of the second cladding material is 5-50 nm.

6. The luminescence conversion material of claim 5, wherein a particle size of the hybrid luminescence conversion particle is 0.1-5 μm, and a particle size of the luminescence conversion material is 0.2-50 μm.

7. The luminescence conversion material of claim 1, wherein the luminescence conversion material further comprises a stacked layer structure formed on the second cladding material and cladded the second cladding material, and the stacked layer structure comprising a plurality of layers of the first cladding material and the second cladding material stacked in an alternating order.

8. A fabrication method of a luminescence conversion material, comprising:
forming a hybrid luminescence conversion particle;
forming a first cladding material on the surface of the hybrid luminescence conversion particle using an acid/base two-step process; and
forming a second cladding material on the first cladding material using an atomic layer deposition process,
wherein the hybrid luminescence conversion particle comprises:
a matrix, and
a plurality of quantum dots uniformly dispersed in the matrix,
wherein the first cladding material comprises a silicon oxide, and a ratio α (absorbance ratio α: $A_{939}/A_{1000\text{-}1150}$) of the absorbance at 939 cm$^{-1}$ ($A_{939}$) to the absorbance peak at 1000-1150 cm$^{-1}$ ($A_{1000\text{-}1150}$) in a Fourier-transform infrared spectroscopy (FTIR) spectrum of the first cladding material is less than or equal to 0.8.

9. The fabrication method of a luminescence conversion material of claim 8, wherein a surface of each of the quantum dots is modified with a ligand, the matrix comprises a cross-linkable monomer, the ligand cross-links with the cross-linkable monomer, and the ligand is selected from a group consisting of an acrylic monomer containing a thiol group, an amine group and/or a carboxylic acid group, an epoxy resin monomer, a silane monomer, a siloxane monomer and any combination thereof, and the cross-linkable monomer is selected from a group consisting of acrylic monomers, epoxy resin monomers, siloxane monomers, and any combination thereof.

10. The fabrication method of a luminescence conversion material of claim 8, wherein the second cladding material comprises metal oxide, the first cladding material has a layer structure, the second cladding material has a layer structure, a thickness of the layer structure of the first cladding material is 20-2000 nm, and a thickness of the layer structure of the second cladding material is 5-50 nm.

11. The fabrication method of a luminescence conversion material of claim 10, wherein a particle size of the hybrid luminescence conversion particle is 0.1-40 μm, and a particle size of the luminescence conversion material is 0.2-50 μm.

12. The fabrication method of a luminescence conversion material of claim 8, wherein the first cladding material and a plurality of the hybrid luminescence conversion particles form a spherical encapsulation structure, the second cladding material has a layer structure, a particle size of the spherical encapsulation structure is 0.1-40 μm, and a thickness of the layer structure of the second cladding material is 5-50 nm.

13. The fabrication method of a luminescence conversion material of claim 12, wherein a particle size of the hybrid luminescence conversion particle is 0.1-5 μm, and a particle size of the luminescence conversion material is 0.2-50 μm.

14. The fabrication method of a luminescence conversion material of claim 8, wherein the steps of forming a first cladding material and forming a second cladding material are repeated several times.

15. A display device, comprising the luminescence conversion material as claimed in claim 1.

16. A luminescence device, comprising the luminescence conversion material as claimed in claim 1.

* * * * *